United States Patent
Sakoda et al.

(10) Patent No.: US 9,616,901 B2
(45) Date of Patent: *Apr. 11, 2017

(54) MOBILE OBJECT, SYSTEM, AND STORAGE MEDIUM

(71) Applicant: c/o SONY CORPORATION, Tokyo (JP)

(72) Inventors: Kazuyuki Sakoda, Chiba (JP); Yoichiro Sako, Tokyo (JP); Kohei Asada, Kanagawa (JP); Katsuhisa Aratani, Kanagawa (JP); Kazuhiro Watanabe, Tokyo (JP); Takatoshi Nakamura, Kanagawa (JP); Mitsuru Takehara, Tokyo (JP); Yuki Koga, Tokyo (JP); Hiroyuki Hanaya, Kanagawa (JP); Tomoya Onuma, Shizuoka (JP); Akira Tange, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,123

(22) Filed: Jul. 24, 2015

(65) Prior Publication Data

US 2015/0329122 A1 Nov. 19, 2015

Related U.S. Application Data

(63) Continuation of application No. 14/511,556, filed on Oct. 10, 2014, now Pat. No. 9,108,642, which is a
(Continued)

(30) Foreign Application Priority Data

Aug. 8, 2012 (JP) .................................. 2012-175695

(51) Int. Cl.
*B60W 50/08* (2012.01)
*G06F 17/00* (2006.01)
(Continued)

(52) U.S. Cl.
CPC .......... *B60W 50/082* (2013.01); *B60K 35/00* (2013.01); *B60W 50/087* (2013.01);
(Continued)

(58) Field of Classification Search
CPC ............ G02B 2027/0138; G02B 27/01; G02B 2027/014; G06F 17/00; H04L 29/08; B60K 35/00
(Continued)

(56) References Cited

U.S. PATENT DOCUMENTS

2013/0293580 A1* 11/2013 Spivack ............. G06Q 30/0643
345/633
2014/0309880 A1* 10/2014 Ricci .................. G07C 9/00158
701/36
(Continued)

FOREIGN PATENT DOCUMENTS

JP 09-044077 A 2/1997
JP 10-066058 A 3/1998
(Continued)

OTHER PUBLICATIONS

Balillot et al., A tracker alignment framework for augmented reality, 2003, IEEE, p. 142-150.*
(Continued)

*Primary Examiner* — McDieunel Marc
(74) *Attorney, Agent, or Firm* — Chip Law Group

(57) ABSTRACT

There is provided a mobile object including an input detection unit configured to detect an input from an outside, an acquisition unit configured to acquire environmental information detected by a sensor in a remote location, in accor-
(Continued)

dance with a content of detection performed by the input detection unit, and a control unit configured to control an actuator other than a driving actuator in accordance with the environmental information acquired by the acquisition unit, the driving actuator relating to movement of the mobile object.

20 Claims, 12 Drawing Sheets

Related U.S. Application Data continuation of application No. 13/951,725, filed on Jul. 26, 2013, now Pat. No. 8,914,236.

(51) Int. Cl.
| | |
|---|---|
| G02B 27/01 | (2006.01) |
| H04W 4/00 | (2009.01) |
| B60K 35/00 | (2006.01) |
| B60W 50/10 | (2012.01) |
| G06F 3/01 | (2006.01) |
| G06F 3/041 | (2006.01) |
| G06F 3/16 | (2006.01) |
| H04L 29/08 | (2006.01) |

(52) U.S. Cl.
CPC ............ *B60W 50/10* (2013.01); *G02B 27/01* (2013.01); *G06F 3/017* (2013.01); *G06F 3/041* (2013.01); *G06F 3/167* (2013.01); *G06F 17/00* (2013.01); *H04L 29/08* (2013.01); *H04W 4/006* (2013.01); *G02B 2027/014* (2013.01); *G02B 2027/0138* (2013.01); *H04L 67/12* (2013.01)

(58) Field of Classification Search
USPC ........ 701/2, 500, 512; 340/407, 2, 439, 506, 340/576, 905
See application file for complete search history.

(56) References Cited

U.S. PATENT DOCUMENTS

| | | | | |
|---|---|---|---|---|
| 2014/0309886 A1* | 10/2014 | Ricci | .................. | G07C 9/00158 701/41 |
| 2014/0309891 A1* | 10/2014 | Ricci | .................. | G07C 9/00158 701/48 |
| 2014/0310610 A1* | 10/2014 | Ricci | .................. | G07C 9/00158 715/744 |
| 2014/0310739 A1* | 10/2014 | Ricci | ..................... | H04W 48/04 725/28 |
| 2015/0232065 A1* | 8/2015 | Ricci | ...................... | B60R 25/01 701/36 |

FOREIGN PATENT DOCUMENTS

| | | |
|---|---|---|
| JP | 2001-222794 A | 8/2001 |
| JP | 2009-516189 A | 4/2009 |

OTHER PUBLICATIONS

Kondo et al., Poster: Free Form Projection Display Virtual Image Located Inside Real Object, 2008, IEEE, p. 159-160.*
Japanese Office Action Application No. 2012-175695; Issued Oct. 20, 2015.
Office Action received for Japanese Patent application No. 2012-175695, mailed on Jun. 14, 2016, 7 pages of office action.

* cited by examiner

FIG. 7
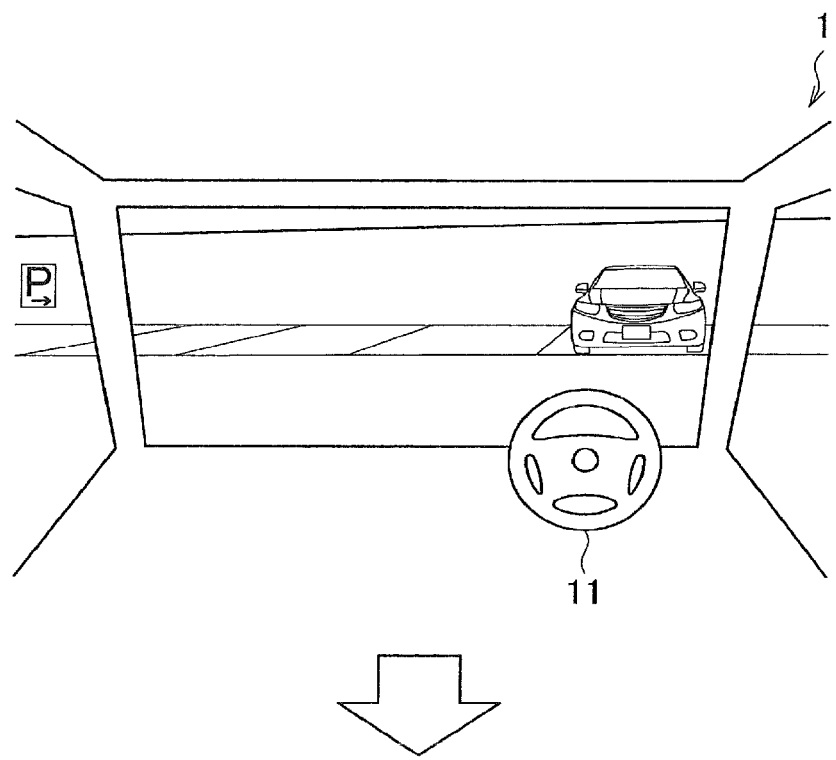
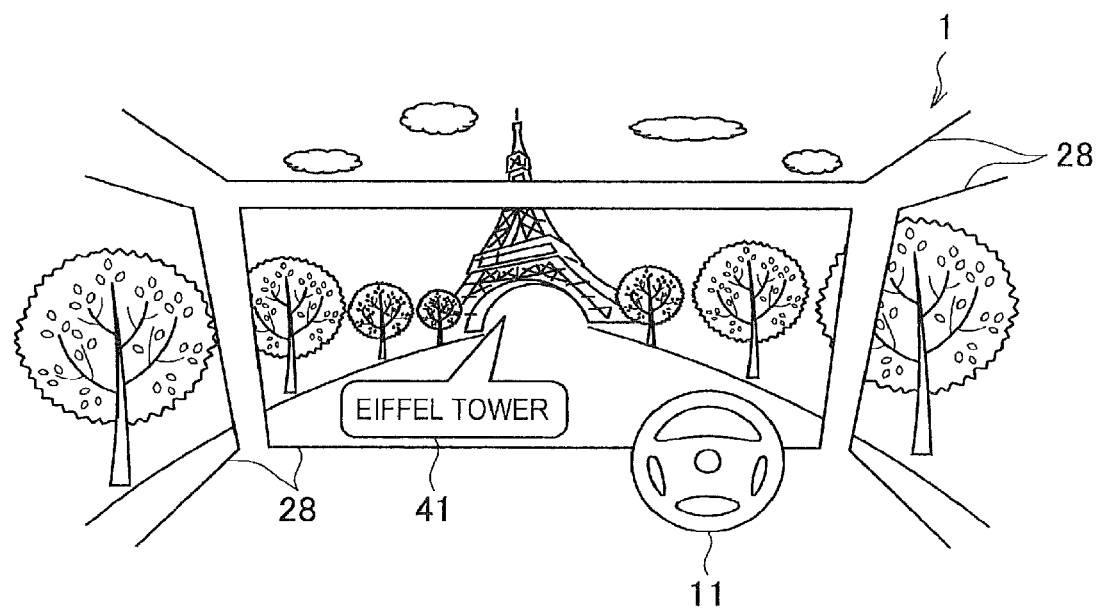

MOBILE OBJECT, SYSTEM, AND STORAGE MEDIUM

CROSS-REFERENCE TO RELATED APPLICATIONS/INCORPORATION BY REFERENCE

The present application is a continuation of U.S. patent application Ser. No. 14/511,556 filed on Oct. 10, 2014 which is a continuation application of U.S. patent application Ser. No. 13/951,725 filed on Jul. 26, 2013 which claims priority of Japanese Patent Appl. No. 2012-175695 filed on Aug. 8, 2012 in the Japanese Patent Office, the entire content of which is incorporated herein by reference.

BACKGROUND

The present disclosure relates to a mobile object, a system, and a storage medium.

Generally speaking, an automobile for a driving use includes a driving actuator such as tires or an engine. A driver manipulates the driving actuator through a handle, a brake, an accelerator, and the like to drive the automobile.

An automobile also includes an audio system that uses an in-car speaker, and an air conditioning device that makes the condition in the automobile more comfortable. In recent years, a car navigation system that uses an in-car display has also been provided. Those systems are each independent, and each operate in accordance with a user manipulation.

As a system that is provided to an automobile, for example, JP 2012-068481A proposes a system for realizing augmented reality in which information according to a scene in a real space is displayed on a transmissive display such that the information is superimposed on the scene in the real space.

JP 2009-023651A also proposes an information display system for a vehicle that uses a head-up display which has video projected on the windshield of the vehicle so that a passenger can visually recognize the video.

In this way, various independent systems are mounted on an automobile that is for a driving use. Meanwhile, in the field of game devices, a dummy driving game machine which imitates an automobile has been known.

For example, JP 2008-246136A proposes, as a dummy driving game machine that imitates an automobile, a game device that projects video on a window display device and mounts a wheel on a roller so that the player can drive a virtual automobile more realistically in a virtual space.

SUMMARY

However, none of JP 2012-068481A, JP 2009-023651A, and JP 2008-246136A has disclosed technologies for considering a real automobile for an actual driving use as a device (immersive feeling providing device) that can recreate spatial presence of a specific place and can provide an immersive feeling.

An audio system and an air conditioning device provided in an automobile that is for a driving use can be certainly an actuator for recreating spatial presence, but they are independent systems and are not configured to be interactively controlled such that spatial presence of a remote location is recreated.

The present disclosure therefore proposes a mobile object, a system, and a storage medium that are novel and improved, and can provide, in an automobile for a driving use, an immersive feeling into a predetermined space.

According to an embodiment of the present disclosure, there is provided a mobile object including an input detection unit configured to detect an input from an outside, an acquisition unit configured to acquire environmental information detected by a sensor in a remote location, in accordance with a content of detection performed by the input detection unit, and a control unit configured to control an actuator other than a driving actuator in accordance with the environmental information acquired by the acquisition unit, the driving actuator relating to movement of the mobile object.

According to another embodiment of the present disclosure, there is provided a system including a mobile object including an input detection unit configured to detect an input from an outside, an acquisition unit configured to acquire, from a server, environmental information detected by a sensor in a remote location, in accordance with a content of detection performed by the input detection unit, and a control unit configured to control an actuator other than a driving actuator in accordance with the environmental information acquired by the acquisition unit, the driving actuator relating to movement of the mobile object, and the server including a first reception unit configured to receive, from a sensor disposed in a remote location, environmental information detected by the sensor, a second reception unit configured to receive the content of the detection performed by the input detection unit from the mobile object, and a transmission unit configured to transmit, to the mobile object, the environmental information received by the first reception unit, in accordance with the content of the detection received by the second reception unit.

According to still another embodiment of the present disclosure, there is provided a storage medium having a program stored thereon, the program causing a computer to function as an input detection unit configured to detect an input from an outside, an acquisition unit configured to acquire environmental information detected by a sensor in a remote location, in accordance with a content of detection performed by the input detection unit, and a control unit configured to control an actuator other than a driving actuator in accordance with the environmental information acquired by the acquisition unit, the driving actuator relating to movement of the mobile object.

According to the embodiments of the present disclosure described above, it is possible to provide, in an automobile for a driving use, an immersive feeling into a predetermined space.

BRIEF DESCRIPTION OF THE DRAWINGS

FIG. 7 is a diagram illustrating an example of AR display in recreating an immersive space according to the present embodiment;

DETAILED DESCRIPTION OF THE EMBODIMENT(S)

Figure 1:
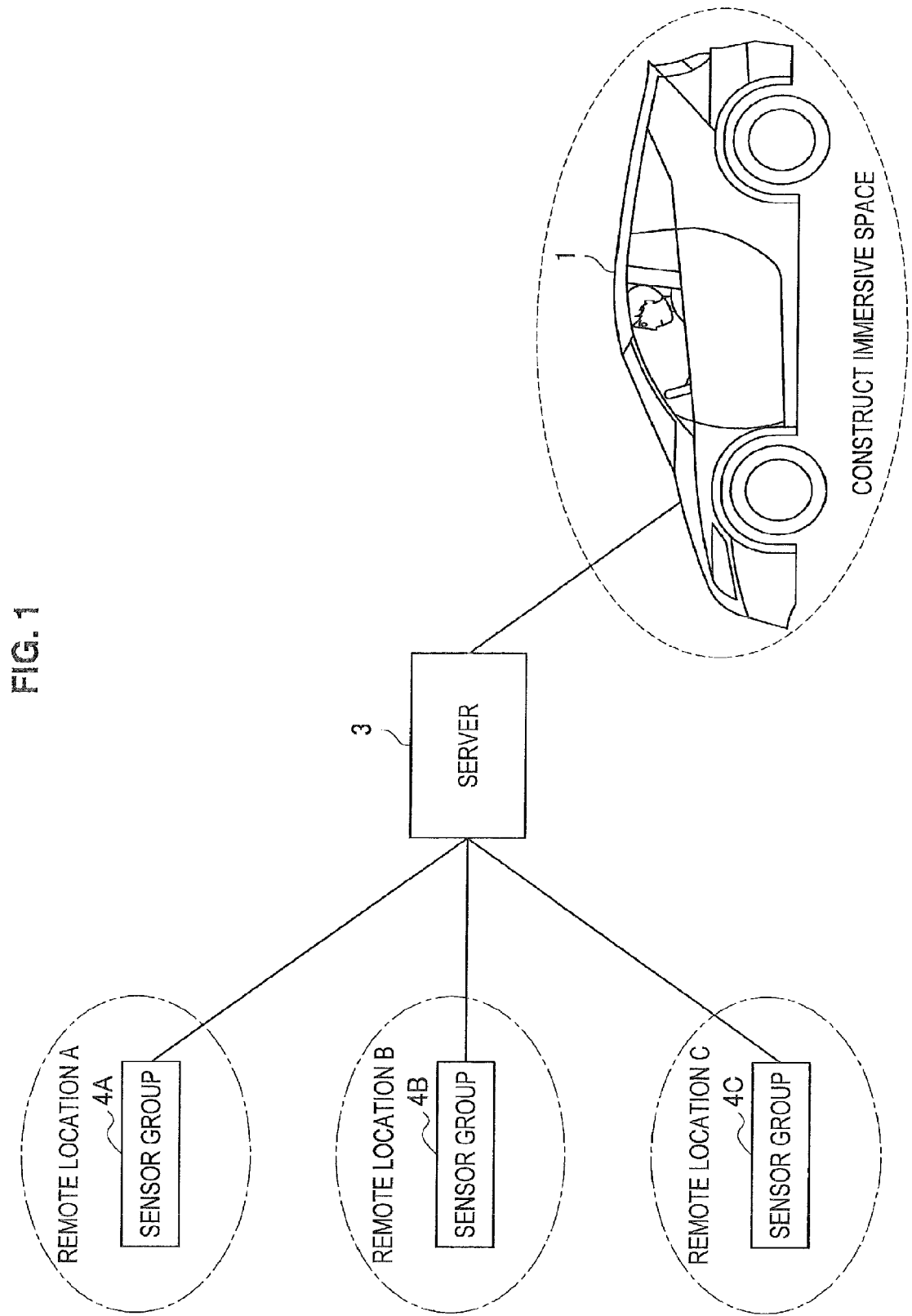
FIG. 1 is a diagram for describing an overview of an immersive feeling providing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order:
1. Overview of Immersive Feeling Providing System according to Embodiment of Present Disclosure
2. Basic Configurations
    2-1. Immersive Car
    2-2. Server
3. Operation Processes
    3-1. Process of Switching Modes
    3-2. Process of Acquiring Environmental Information
4. Complement
5. Conclusion

1. Overview of Immersive Feeling Providing System According to Embodiment of Present Disclosure First, an overview of an immersive feeling providing system according to an embodiment of the present disclosure will be described with reference to FIG. 1. FIG. 1 is a diagram for describing the overview of the immersive feeling providing system according to the embodiment of the present disclosure. As illustrated in FIG. 1, the immersive feeling providing system according to the present embodiment assumes that a great number of sensor groups are disposed in various places around the world. In the example illustrated in FIG. 1, sensor groups 4A, 4B, and 4C are disposed in remote locations A, B, and C, respectively, as an example. The sensor groups 4A, 4B, and 4C are capable of performing data communication with a server 3, and the server 3 is capable of performing data communication with an immersive car 1.

Sensor groups 4 include various sensors (for example, image sensor, microphone, temperature sensor, fragrance sensor, and wind volume sensor) capable of acquiring environmental information in a remote location such as image information, audio information, temperature information, fragrance information and a condition of wind, and transmit the environmental information in the remote location to a server 3. Each sensor group 4 also retains information regarding in which place each sensor is disposed in the remote location, and whether the acquired environmental information interacts with environmental information of another sensor in an adjacent place, and transmits this type of information to the server 3 as necessary.

The server 3 grasps, based on the environmental information transmitted from various remote locations, which pieces of the environmental information should be combined and output to recreate a situation (spatial presence) of a specific remote location. Once receiving a recreation request command of a target point from a device such as the immersive car 1 that recreates presence of a specific place and provides an immersive feeling, the server 3 extracts environmental information used for recreating the presence of the target point and transmits the extracted environmental information to an immersive feeling providing device such as the immersive car 1. The immersive car 1 sometimes transmits a recreation request command that changes a target point from hour to hour to the server 3. In such a case, the server 3 sequentially extracts new environmental information according to the updated target point, and sequentially transmits the new extracted environmental information to the immersive car 1.

The immersive car 1 is an example of a mobile object that recreates presence of a specific place, based on the environmental information received from the server 3, and provides an immersive feeling. The immersive car 1 according to the present embodiment can switch two modes including a driving mode (movement mode) for a usual driving use and an immersive mode (immersion mode) for a purpose of enjoying an immersive feeling into a specific place.

It is noted that a usual automobile for a driving use is not configured to switch the modes to the immersive mode, and it is not also assumed that the modes are switched to the immersive mode. A configuration of the usual automobile will be described below with reference to FIG. 2.

(Configuration of Usual Automobile)

Figure 2:
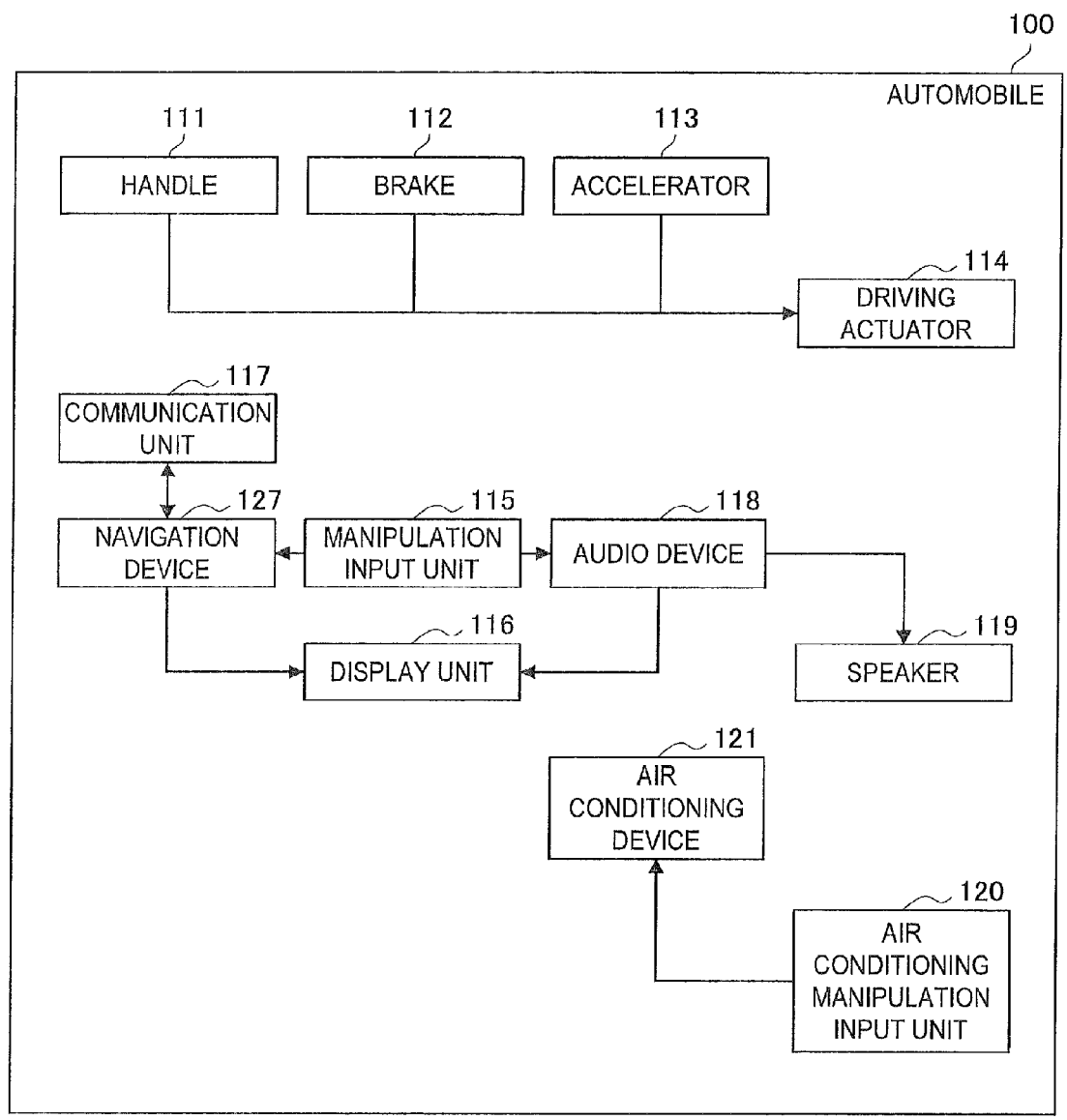
FIG. 2 is a block diagram illustrating a configuration of a usual automobile.

FIG. 2 is a block diagram illustrating a configuration of a usual automobile 100. As illustrated in FIG. 2, the usual automobile 100 includes a handle 111, a brake 112, an accelerator 113, and a driving actuator 114. The automobile 100 also includes a manipulation input unit 115, a display unit 116, a communication unit 117, an audio device 118, a speaker 119, and a navigation device 127. The automobile 100 further includes an air conditioning manipulation input unit 120 and an air conditioning device 121.

The handle 111, the brake 112, and the accelerator 113 are driving input devices for control information that is used for driving the automobile, and are connected to the driving actuator 114, as illustrated in FIG. 2. The driving actuator 114 is, for example, a tire, an engine, or the like, and is driven based on manipulation information from the driving input device.

Furthermore, a lot of general automobiles each have an audio system mounted thereon. Specifically, the audio system includes an audio device 118 configured to read an audio signal from an inserted Compact Disc (CD) or a connected digital music player, and to control a plurality speakers 119 mounted in the automobile to reproduce the audio signal. The audio device 118 controls the speakers 119 to reproduce radio broadcasting received from the communication unit 117.

In recent years, a general automobile frequently has a car navigation system mounted thereon that uses a Global Positioning System (GPS). Specifically, the car navigation system includes a navigation device 127 configured to measure a current position based on signals received by the communication unit 117 from a plurality of GPS satellites to navigate a driving route to a place designated by a user. The navigation device 127 can connect to a cellular system via the communication unit 117 to acquire congestion information. The navigation device 127 can also display map information on the display unit 116 in accordance with a user manipulation and display the driving route to the place designated by the user.

The manipulation input unit 115 is a device (input detection unit) configured to receive a manipulation input made by a user, and may be, for example, a touch sensor provided on the display unit 116. The manipulation input unit 115 outputs a command input by the user to the audio device 118 or the navigation device 127.

The display unit 116 is usually disposed around the center in the font below the windshield. The display unit 116 displays a menu screen, a manipulation screen, and a reproduction screen that relate to an audio system, and a menu screen, a manipulation screen, and a navigation screen that relate a navigation system, etc. The display unit 116 includes, for example, a Liquid Crystal Display (LCD) or an Organic Light-Emitting Diode (OLED).

The air conditioning device 121 controls a temperature of wind and a volume of wind blowing from a plurality of outlets provided in the automobile in accordance with a temperature sensor (not illustrated) configured to measure a temperature in the automobile and a command input by a user from the air conditioning manipulation input unit 120 so that the temperature in the automobile is controlled. The air conditioning manipulation input unit 120 is a control panel configured to receive a user manipulation relating to air conditioning and disposed around the center in the front below the windshield. The control panel includes a temperature setting button, a wind volume adjusting button, a switch for switching outlets, a switch for switching the inside and outside atmosphere, and a switch for turning on/off a power source.

(Background)

A illustrated in FIG. 2, the manipulation information input from the driving input devices (handle 111, brake 112, and accelerator 113) is delivered to only the driving actuator 114 in the above-described usual automobile 100. The audio system, the navigation system, and the air conditioning system are each independent. In this way, the usual automobile 100 has not been intended to integrate and control the driving actuator and an actuator other than the driving actuator such as the speaker 119, the display unit 116, and the air conditioning device 121.

Meanwhile, as a technique of providing a user with such spatial presence as the user feels as if the user visited a remote location, a display device configured to broadly cover the field of view of the user or a technique of disposing a lot of multi-channel speakers and the like around the user is conceivable in order to appeal to the eyes or the ears of the user. It is also effective to realize a technique that appeals to the other sensory organs that perceive fragrance, a temperature, or wind along with the technique of appealing to the eyes or the ears.

Large scale equipment is necessary for realizing the techniques that appeal to various sensory organs of a user in a room of a building, that is, for example, display devices have to be disposed at walls of the room, a lot of speakers are also provided, and a fragrance generator, an air conditioning device, an electric fan, and the like have to be provided based on the detailed calculation.

If the cabin of an automobile is considered as "a space (immersive space) used for recreating spatial presence and providing an immersive feeling," large scale equipment does not have to be newly constructed since the cabin of the automobile includes various actuators in advance.

However, different from a game device as described in JP 2008-246136A, it is difficult to configure the usual real automobile 100 to integrate and control the various actuators as described above. Although the automobile 100 includes the driving input device such as the handle 111, the brake 112, and the accelerator 113 for inputting manipulation information used for driving the automobile 100, the manipulation information is not output out of the automobile 100. It is also difficult for the automobile 100 to decide whether to accept or reject the information received from the outside based on the manipulation information.

Furthermore, the windshield and the side glass of the automobile 100 have to be transparent enough that people in the automobile 100 can look out through the windshield and the side glass. Since a scene outside the automobile 100 is visible through the windshield and the side glass in this way, it is difficult to use the automobile 100 to recreate spatial presence of a remote location and to provide an immersive feeling.

The embodiments of the present disclosure therefore provide immersive feeling providing systems. An immersive feeling providing system according to each embodiment of the present disclosure can recreate, in an immersive car, spatial presence of a specific place, based on environmental information acquired by a sensor group disposed in the specific place, and provide an immersive feeling. The immersive car is not only used as an immersive space for providing an immersive feeling, but also may be for a usual driving use.

The overview of the immersive feeling providing system according to the embodiment of the present disclosure has been described. Next, configurations of an immersive car and a service, which are included in the immersive feeling providing system according to the present embodiment, will be described in detail with reference to the drawings.

2. Basic Configurations

[2-1. Immersive Car]

Figure 3:
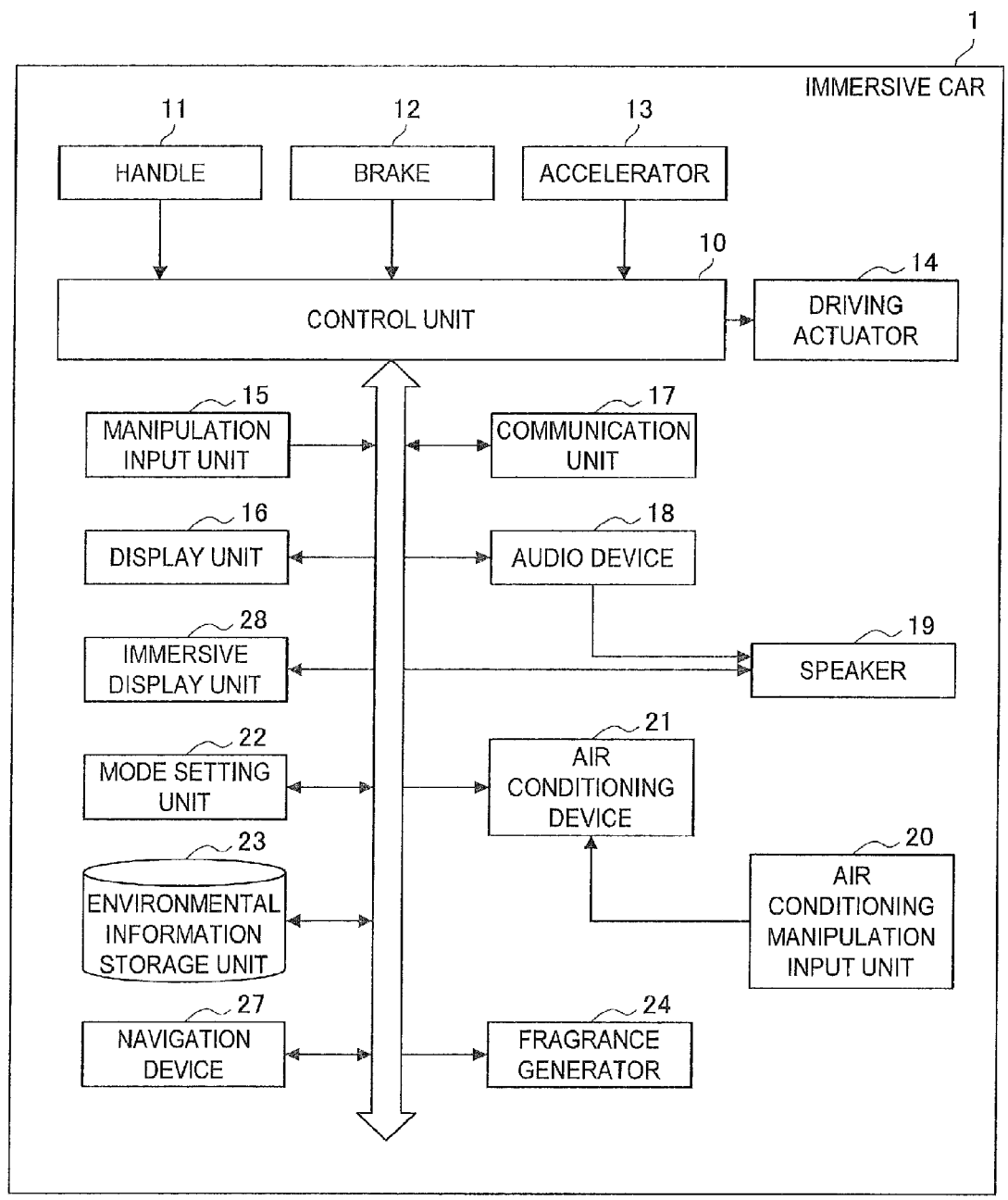
FIG. 3 is a block diagram illustrating a configuration of an immersive car according to the present embodiment.

FIG. 3 is a block diagram illustrating the configuration of the immersive car 1 according to the present embodiment. As illustrated in FIG. 3, the immersive car 1 includes a handle 11, a brake 12, an accelerator 13, a driving actuator 14, a manipulation input unit 15, a display unit 16, a communication unit 17 (acquisition unit), an audio device 18, a speaker 19, an air conditioning device 21, a mode setting unit 22, an environmental information storage unit 23, a navigation device 27, a fragrance generator 24, and an immersive display unit 28, which are controlled by a control unit 10.

Since basic functions of the handle 11, the brake 12, the accelerator 13, the driving actuator 14, the manipulation input unit 15, the display unit 16, the communication unit 17, the audio device 18, the speaker 19, the air conditioning device 21, and the navigation device 27 are the same as the basic functions described above with reference to FIG. 2, the description for them is omitted here. Additionally, the manipulation input unit 15 according to the present embodiment may be a touch sensor provided on the display unit 16 or may be a general information terminal such as a user's smartphone or a tablet terminal that establishes a wired/wireless connection in the cabin with the immersive car 1. The plurality of speakers 19 according to the present embodiment may be disposed on the sides of the cabin, and may be additionally disposed on headrests. The communication unit 17 is an acquisition unit configured to acquire environmental information regarding a specific place (target point) designated by a user from the server 3.

(Immersive Display Unit)

The immersive display unit 28 is provided in the overall interior of the cabin of the immersive car 1 such as the windshield, the side glass, the rear glass, the ceiling, the floor, the sides, and the backs of the front seats of the cabin. The immersive display unit 28 is also provided on the backs of the front seats so that a passenger seated in the rear seat can also enjoy a foreground scene in the immersive space. If the immersive display unit 28 is film-shaped and provided on the windshield, the side glass, or the like, the immersive display unit 28 can be controlled by the control unit 10 to have a higher transmittance during usual driving so as not to interrupt a driver. Alternatively, the immersive display unit 28 may be turned off during usual driving, thereby having a high transmittance. The immersive display unit 28 may also be a flexible display, which is flexibly transformable, so that the immersive display unit 28 may conform to the surface shapes of the ceiling, the floor, the sides, the backs of the font seats, and the like of the cabin.

(Fragrance Generator)

The fragrance generator 24 includes a function of emitting, from a plurality of outlets (not illustrated) of the cabin, a fragrance component that has been stored in advance or a fragrance component that has been generated by combining components for fragrance generation. The fragrance generator 24 may also emit the fragrance component from an outlet from which the air conditioning device 21 outputs wind.

(Environmental Information Storage Unit)

The environmental information storage unit 23 stores environmental information received from the server 3 by the communication unit 17.

(Control Unit)

The control unit 10 controls the whole immersive car 1. For example, the control unit 10 according to the present embodiment performs control in accordance with a command indicating a specific place (target point) designated by a user, which is input from the manipulation input unit 15, such that the control unit 17 requests information (environmental information) for recreating spatial presence of the target point from the server 3. The control unit 10 can control an actuator other than the driving actuator 14 such as the immersive display unit 28, the speaker 19, the air conditioning device 21, or the fragrance generator 24, based on the environmental information received by the communication unit 17 from the server 3, and provide an immersive feeling into the target point.

Specifically, the control unit 10 controls the immersive display unit 28 based on image information included in the environmental information, and has an image obtained by capturing the target point displayed thereon. Then, the control unit 10 performs shield control to lower a transmittance of the immersive display unit 28 that is provided on the windshield or the like such that people in the cabin are not able to look out at a scene.

The control unit 10 performs control based on audio information included in the environmental information such that a sound collected in the target point is reproduced from the speaker 19. The control unit 10 also controls the fragrance generator 24 based on fragrance information included in the environmental information to recreate fragrance detected in the target point.

The control unit 10 further controls a setting temperature and a volume of wind of the air conditioning device 21 based on temperature information and a condition of wind included in the environmental information such that the air conditioning device 21 recreates a temperature and a condition of wind of the target point.

When a user manipulates the driving input device such as the handle 11, the brake 12, or the accelerator 13, the control device 10 also includes a function as an input detection unit configured to perform manipulation detection on the manipulation information as an input into the driving actuator. During the movement mode, which will be described below, the control unit 10 delivers the manipulation information detected from the driving input device to the driving actuator 14 and performs control. Meanwhile, during the immersive mode, which will be described below, the control unit 10 controls the actuator other than the driving actuator 14 in accordance with the manipulation information detected from the driving input device, and provides, in the immersive space, such a feeling as a user drove in the target point.

(Mode Setting Unit)

The mode setting unit 22 may be set to perform the above-described control, which the control unit 10 performs in order to provide an immersive feeling into the target point only when the operation mode of the immersive car 1 is set to the immersive mode.

The mode setting unit 22 can set the operation mode of the immersive car 1 to one of the driving mode, which is for a usual driving use, and the immersive mode (immersion mode), which is used for recreating spatial presence and providing an immersive feeling that a driver enjoys. As illustrated in FIG. 3, the immersive car 1 according to the present embodiment has the control unit 10 configured to capable of integrating and controlling actuators such as the immersive display unit 28, the speaker 19, and the air conditioning device 21 in addition to the driving actuator 14. Thus, switching of the modes allows even a usual real automobile capable of being driven to be used for recreating an immersive space. The mode setting unit 22 may set the operation mode of the immersive car 1 in accordance with a command input by a user from the manipulation input unit 15.

—Driving Mode

When the driving mode has been set, the mode setting unit 22 issues, to the control unit 10, a notification that the driving mode has been set. This notification allows the control unit 10 to perform driving control on the driving actuator 14 (such as the brake or the engine) based on the manipulation information from the driving input device (such as the handle 11, the brake 12, or the accelerator 13) and to actually drive the immersive car 1.

—Immersive Mode

When the immersive mode has been set, the mode setting unit 22 issues, to the control unit 10, a notification that the immersive mode has been set. The control unit 10, which receives this notification, performs such control as described above for providing an immersive feeling into the target point. Specifically, a recreation request command for requesting the information (environmental information) used for recreating spatial presence of the target point is generated and transmitted to the server 3 by the communication unit 17. The control unit 10 also controls the immersive display unit 28, the speaker 19, the air conditioning device 21, and the like based on the environmental information received from the server 3.

The mode setting unit 22 may also issue, to the immersive display unit 28, the speaker 19, the air conditioning device 21, and the like, the notification that the immersive mode has been set. The immersive display unit 28, the speaker 19, the air conditioning unit 21, and the like, which receive the notification, are switched to operate under control for recreating spatial presence performed by the control unit 10.

The control unit 10, which receives the notification that the immersive mode has been set, blocks the delivery of the manipulation information from the driving input device (handle 11, brake 12, and accelerator 13) to the driving actuator 14 (such as the brake and the engine) such that even when the driving input device is manipulated, the automobile would not actually drive. At the same time, the control unit 10 may use the manipulation information from the driving input device for the control in recreating spatial presence of the target point. That is, the control unit 10 can control the immersive display unit 28, the speaker 19, the air conditioning device 21, and the like based on the manipulation information from the driving input device to provide such a feeling as the user drove in the target point.

The configuration of the immersive car 1 according to the present embodiment has been described in detail. Next, a configuration of the server 3 according to the present embodiment will be described with reference to FIG. 4.

[2-3. Server]

Figure 4:
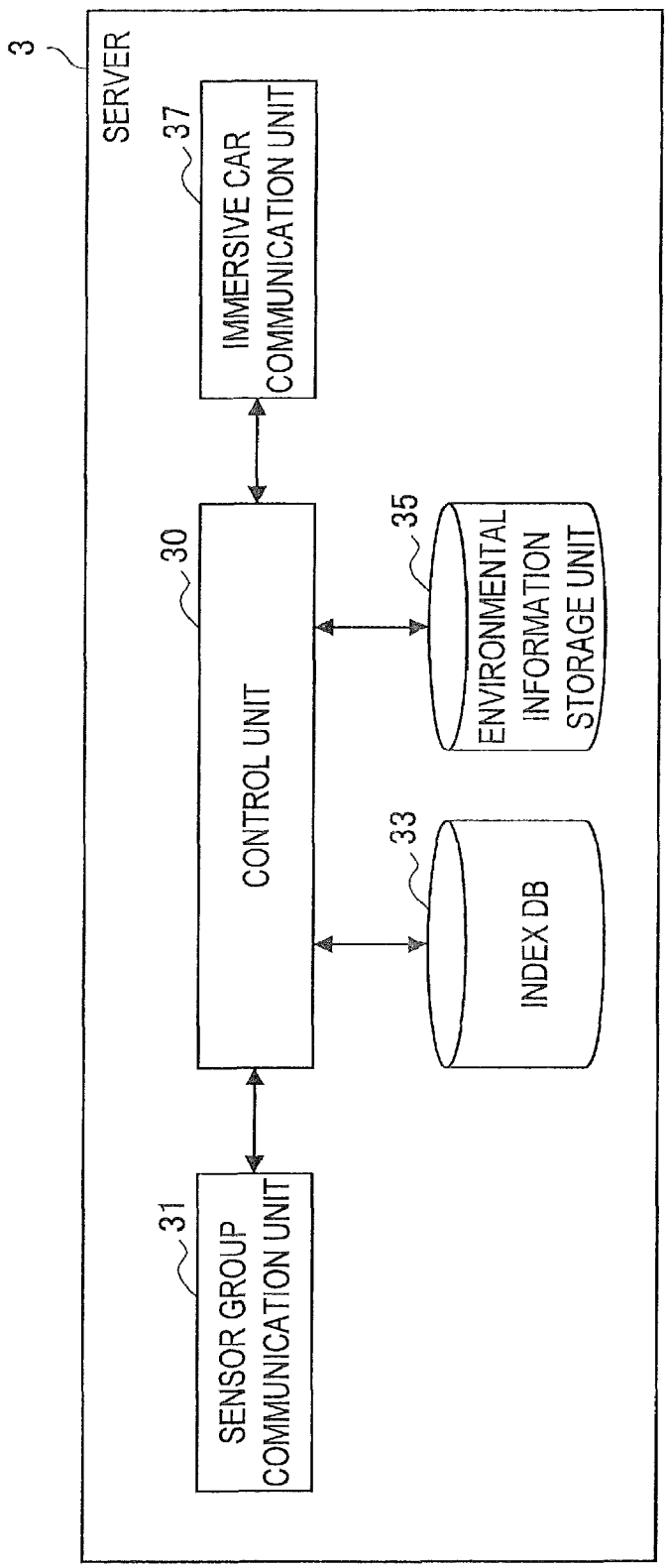
FIG. 4 is a block diagram illustrating a configuration of a server according to the present embodiment.

FIG. 4 is a block diagram illustrating the configuration of the server 3 according to the present embodiment. As illustrated in FIG. 4, the server 3 includes a control unit 30, a sensor group communication unit 31, an index database (DB) 33, an environmental information storage unit 35, and an immersive car communication unit 37. Each configuration will be described below.

(Sensor Group Communication Unit)

The sensor group communication unit 31 connects to a sensor groups 4 (see FIG. 1) disposed in each remote location and performs data communication. Specifically, the sensor group communication unit 31 receives sensor data (environmental information) from the sensor group 4 and outputs the sensor data to the control unit 30. The sensor group communication unit 31 may continuously receive the sensor data from the sensor group 4 or may receive the sensor data when the control unit 30 issues an acquisition instruction.

(Immersive Car Communication Unit)

The immersive car communication unit 37 connects to the immersive car 1 and performs data communication. Specifically, the immersive car communication unit 37 receives, from the immersive car 1, a recreation request command that requests environmental information for recreating spatial presence of the target point, and outputs the environmental information to the control unit 30. The immersive car communication unit 37 also transmits the environmental information extracted by the control unit 30 to the immersive car 1, which has transmitted the recreation request command Additionally, in the example illustrated in FIG. 1, the server 3 connects to the single immersive car 1 as an example, but the number of immersive cars is not limited thereto in the present embodiment. The server 3 may naturally connect to a plurality of the immersive cars 1.

(Control Unit)

The control unit 30 causes the environmental information storage unit 35 to store the environmental information received by the sensor group communication unit 31. Before the control unit 30 causes the environmental information storage unit 35 to store the environmental information, the control unit 30 may perform a compression process on the environmental information. Then, the control unit 30 registers index information of the environmental information stored in the environmental information storage unit 35 in the index DB 33. The index DB 33 manages the environmental information that is stored in the environmental information storage unit 35, and it is hereby easy to search for which environmental information the server 3 retains.

Once the immersive car communication unit 37 receives the recreation request command from the immersive car 1, the control unit 30 confirms with reference to the index DB 33 where environmental information regarding a designated specific place (target point) is retained. Upon referring to the index DB 33 and confirming that the environmental information regarding the target point is retained by the server 3, the control unit 30 acquires the environmental information regarding the target point and converts the environmental information into an appropriate format to transmit the environmental information from the immersive car communication unit 37 to the immersive car 1. The environmental information acquired for being transmitted to the immersive car 1 may be real time (actual time) environmental information transmitted from the sensor group 4, the past environmental information that has been already stored in the environmental information storage unit 35, or a combination thereof.

(Index DB)

The index DB 33 is a storage unit for managing which storage device stores by which sensor and when environmental information is received. Specifically, the index DB 33 stores, as index information for each piece of environmental information, which storage unit (environmental information storage unit 35, here) stores from which sensor and when environmental information is received.

(Environmental Information Storage Unit)

The environmental information storage unit 35 is a storage unit configured to store the environmental information received by the sensor group communication unit 31. As described above, the environmental information to be stored by the environmental information storage unit 35 includes image information, audio information, fragrance information, and a condition of wind, and may store the environmental information in the state in which the control unit 30 compresses the environmental information. Additionally, a format or the like for information to be stored is not particularly limited.

The configuration of the server 3 according to the present embodiment has been described in detail. In the example illustrated in FIG. 4, each configuration of the server 3 is disposed in a single apparatus, but the disposition is not limited thereto in the present embodiment. It is needless to say that each structure may be dispersively disposed and does not necessarily have to be disposed in a single place in a physical perspective. Next, operation processes of the immersive feeling providing system according to the present embodiment will be described in detail with reference to FIGS. 5 to 7.

3. Operation Processes

[3-1. Process of Switching Modes]

Figure 5:
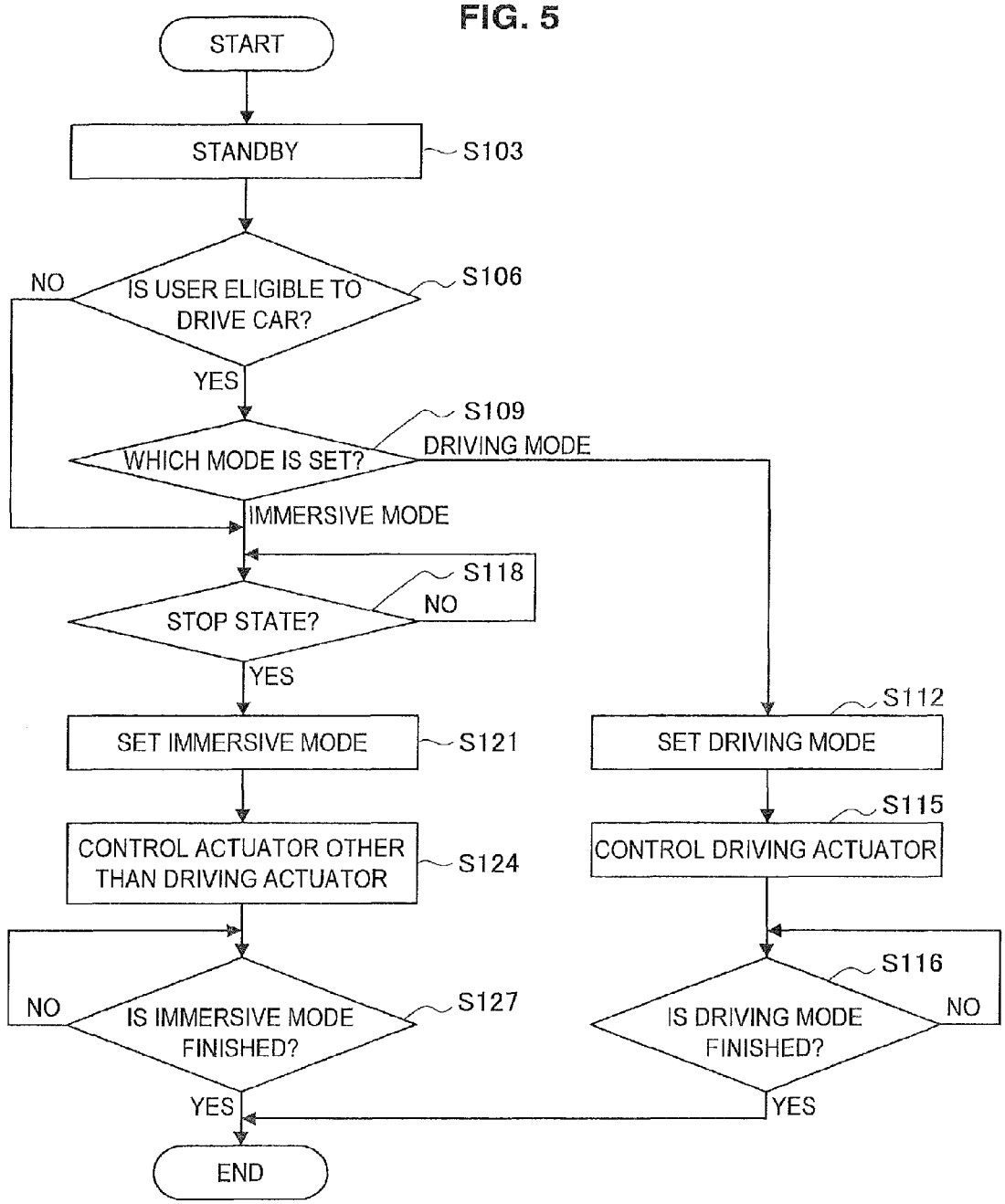
FIG. 5 is a flowchart illustrating a process of switching modes in the immersive car according to the present embodiment.

FIG. 5 is a flowchart illustrating a process of switching modes in the immersive car 1 according to the present embodiment. As illustrated in FIG. 5, first, the immersive car 1 is on standby in step S103. The standby means a state in which there is no passenger in the automobile or a key of the immersive car 1 is not inserted.

Next, when the key of the immersive car 1 is inserted or a user sits down on a driver seat so that the standby is cancelled, the control unit 10 determines, in step S106, whether the user sitting on the driver seat is eligible to drive a car. The control unit 10 may determine whether the user is eligible by reading a driver's license, referring to eligible person information (including biological information of the eligible person) recorded in advance, recognizing the face (whether the user is an adult or a child), or the like.

Next, when it is determined that the user is eligible to drive a car, the manipulation input unit 15 receives, in step S109, a command indicating that the driving mode or the immersive mode is set, based on the user manipulation.

Next, when the command indicates that the driving mode is set, the mode setting unit 22 sets, in step S112, the operation mode of the immersive car 1 to the driving mode. The mode setting unit 22 also issues, to the control unit 10, a notification that the driving mode has been set.

Next, in step S115, the control unit 10 delivers the manipulation information received from the driving input device to the driving actuator to control the driving actuator, and causes the immersive car 1 to be actually driven.

Next, once the key of the immersive car 1 is removed or a manipulation is performed from the manipulation input unit 15 to input a command for finishing the driving mode in step S116, the control unit 10 finishes the driving mode.

To the contrary, when it is determined, in step S106, that the user is not a person eligible to drive a car or when a command is received, in step S109, indicating that the immersive mode is set, the control unit 10 determines, in step S118, whether the immersive car 1 is in a stop state. For example, the control unit 10 may determine whether the immersive car 1 is currently in the stop state, based on whether a shift lever (not illustrated) is put in parking, whether the hand brake is pulled up, whether the tires are rotating, or the like. In this way, before switching the operation mode to the immersive mode, it is determined whether the immersive car 1 is in the stop state so that it is possible to secure safety in switching the modes in an automobile capable of being actually driven.

Next, when it is determined that the immersive car 1 is in the stop state, the mode setting unit 22 sets, in step S121, the operation mode of the immersive car 1 to the immersive mode. The mode setting unit 22 also issues, to the control unit 10, a notification that the immersive mode has been set. Once the immersive mode is set, the control unit 10 blocks the delivery of the manipulation information from the driving input device to the driving actuator 14, as described above. The control unit 10 may also handle (command validation) the manipulation information from the driving input device as a driving manipulation command in an immersive space.

If the immersive mode has been set, the control unit 10 may control the display unit 16 to display a screen for facilitating an input of the target point. The control unit 10 also generates a recreation request command that requests environmental information for recreating spatial creation in a specific place (target point) designated by a user manipulation through the manipulation input unit 15, transmits the recreation request command to the server 3, and acquires environmental information from the server 3.

Next, in step S124, the control unit 10 controls an actuator other than the driving actuator 14, recreates spatial presence of the target point, based on the environmental information acquired from the server 3, and provides an immersive feeling.

Once the key of the immersive car 1 is removed or a manipulation is performed from the manipulation input unit 15 so that a command for finishing the immersive mode is input in step S127, the control unit 10 finishes the immersive mode.

The process of switching modes in the immersive car 1 according to the present embodiment has been described. Next, acquisition of environmental information regarding the target point when the immersive mode is set, which has been described in S121, will be described in detail with reference to FIG. 6.

[3-2. Process of Acquiring Environmental Information]

Figure 6:
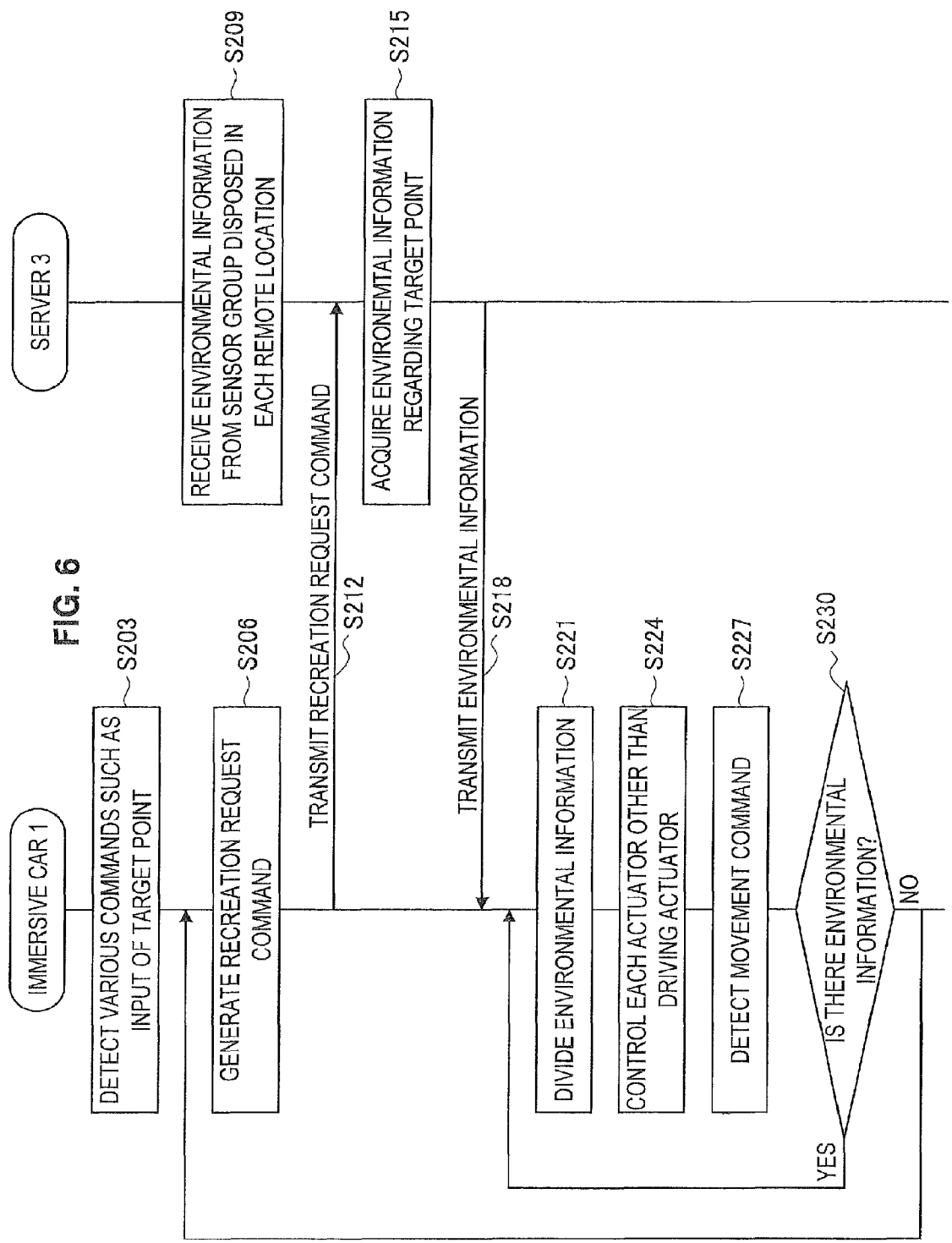
FIG. 6 is a flowchart illustrating a process of acquiring environmental information regarding a target point in an immersive mode according to the present embodiment.

FIG. 6 is a flowchart illustrating a process of acquiring the environmental information regarding the target point in the immersive mode according to the present embodiment. As illustrated in FIG. 6, first, in step S203, the manipulation input unit 15 of the immersive car 1 detects various commands such as an input of the target point. As the input of the target point, for example, letters such as the name (for example, the name of a city or the name of a region) or the address of the target point, or the name of an institution (for example, the name of a station, the name of a building, and the name of a park) are input through a target point input screen displayed on the display unit 16. The manipulation input unit 15 may detect this kind of letter information representing the target point as position information.

Next, in step S206, the control unit 10 generates a recreation request command that requests environmental information to be used for recreating spatial presence of the target point, based on the position information of the target point detected by the manipulation input unit 15.

Meanwhile, in step S209, the server 3 receives, from a sensor group that is disposed in each remote location, environmental information, which is data (sensor data) detected by the sensor group. The server 3 may further store the received environmental information in the environmental information storage unit 35 and register index information of the stored environmental information in the index DB 33.

Next, in step S212, the control unit 10 of the immersive car 1 transmits the generated recreation request command from the communication unit 17 to the server 3.

Next, in step S215, the server 3 acquires the environmental information received from the sensor group disposed in the requested target point, based on the received recreation request command.

Next, in step S218, the server 3 transmits the acquired environmental information to the immersive car 1.

Next, in step S221, the control unit 10 of the immersive car 1 divides the environmental information received from the server 3 into recreation element data for each actuator. Specifically, for example, the control unit 10 divides the environmental information received from the server 3 into image information, audio information, temperature information, a condition of wind (wind volume information), and the like.

Next, in step S224, the control unit 10 controls each actuator other than the driving actuator 14, based on each divided recreation element data. For example, the control unit 10 can recreate such presence as a user were actually in a target point designated by the user, by performing control such that an image captured in the target point is displayed on the immersive display unit 28 provided on the windshield, the side glass, the ceiling, or the like.

The control unit 10 can also recreate such presence as the user were actually in the target point, by performing control such that a sound collected in the target point is reproduced from the speaker 19 disposed in the car.

The control unit 10 can further recreate such presence as the user were actually in the target point, by controlling the air conditioning device 21 to recreate the temperature detected in the target point. In addition, the air conditioning device 21 is controlled to output the volume of wind detected in the target point so such presence as the user were in the target point can be recreated.

Next, in step S227, the control unit 10 of the immersive car 1 detects a movement command. The movement command may be manipulation information output when a user manipulates the driving input device (handle 11, brake 12, or accelerator 13) so as to performing virtual driving in the target point, or may be position information of a next target point input from the manipulation input unit 15.

Next, in step S230, the control unit 10 determines whether the environmental information storage unit 23 stores environmental information capable of being used for handling the above-mentioned movement command. The environmental information storage unit 23 stores the environmental information transmitted from the server 3 in S218. For example, when the movement command is manipulation information output from the driving input device and to be used for virtual driving around the target point, it is possible to handle the movement command if environmental information around the target point has also been already received.

When the environmental information storage unit 23 stores the environmental information capable of being used for handling the above-mentioned movement command (S230/Yes), the control unit 10 extracts the environmental information and repeats processes shown in S221 to S224.

To the contrary, when the environmental information storage unit 23 does not stores the environmental information capable of being used for handling the above-mentioned movement command (S230/No), the control unit 10 repeats the processes shown in S206 to S218 and newly acquires environmental information from the server 3. Next, it is possible by repeating the processes shown in S221 to S224 to recreate such spatial presence as the automobile were driven around the target point, in accordance with the manipulation information from the driving input device. The control unit 10 may also control the air conditioning device 21 to output wind and provide such a feeling as the automobile is driven.

In this way, the immersive car 1 can continuously change an immersive space by repeating the above-described processes shown in S206 to S230 and a user can virtually drive from the target point, for example.

The process of acquiring the environmental information regarding the target point in the immersive mode according to the present embodiment has been described in detail. Next, some complements are added to the immersive feeling providing system according to the present embodiment will be described.

4. Compliment

[4-1. AR Display]

In recreating an immersive space according to the present embodiment, the control unit 10 may superimpose, on an image displayed on the immersive display unit 28, descriptive information for an object (such as a building and a natural object) in the image like Augmented Reality (AR). Here, an example of AR display is illustrated in FIG. 7.

As illustrated in FIG. 7, when the immersive car 1 is in the stop state in a parking area or the like, the immersion mode is set. Once a target point is input, a scene outside the windows is shielded in a real space illustrated in FIG. 7 and an image showing the target point is displayed on the immersive display unit 28, as illustrated in the lower view of FIG. 7. As illustrated in the lower view of FIG. 7, an indication 41 indicating the descriptive information (such as the name or the history) for the object in the displayed image is displayed. Indication data of the descriptive information may be included in image information received from the server 3. The AR display may be switched between display/non-display in accordance with an instruction of a user.

Although, in the example illustrated in FIG. 7, the descriptive information for the object in the image is displayed as an image, the control unit 10 according to the present embodiment may also perform control such that a sound is output from the speaker 19 in the automobile.

[4-2. Other Techniques of Inputting Command]

A target point is input as letter information through the manipulation input unit 15, and the driving input device is used for virtual driving in the above-described embodiment. However, a technique of inputting a command in the immersive feeling providing system according to the embodiment of the present disclosure is not limited thereto. Another immersive car 1' that can have a command input therein will be described with reference to FIG. 8.

Figure 8:
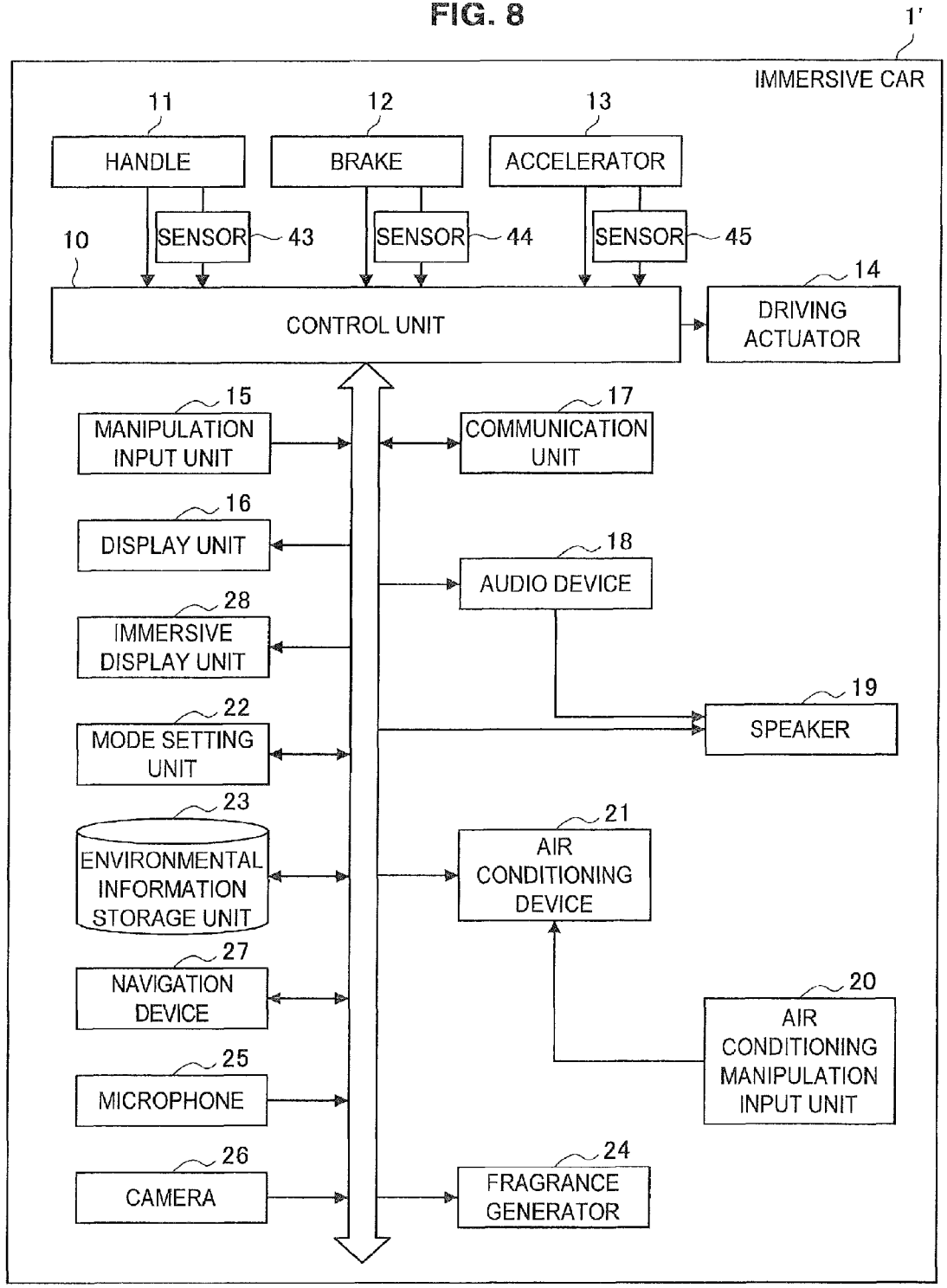
FIG. 8 is a block diagram illustrating a configuration of an immersive car according to a modified example of the present embodiment.

FIG. 8 is a block diagram illustrating a configuration of the immersive car 1' according to a modified example of the present embodiment. As illustrated in FIG. 8, the immersive car 1' according to the modified example of the present embodiment includes a microphone 25 (referred to as mike 25, hereinafter), a camera 26, and sensors 43, 44, and 45 in addition to the configuration illustrated in FIG. 3.

The mike 25 collects a sound in the car such as a voice articulated from a user and outputs the sound to the control unit 10. In this case, the control unit 10 analyzes the collected user's voice and detects an input command (such as a target point designation or a movement instruction).

The camera 26 captures video inside the car such as the user, and outputs the captured image to the control unit 10. In this case, the control unit 10 recognizes a motion, a posture, a gesture, and the like of the user based on the captured image and detects an input command.

The sensors 43, 44, and 45 are each provided in the driving input device, detect a magnitude (pressure) of force of a user manipulation, and output the magnitude to the control unit 10. In this case, the control unit 10 detects an input command in accordance with the detected pressure. The sensor 43 provided in the handle 11 includes a function as a humidity sensor and may detect a situation in which the user's hands are sweating. In this case, for example, the control unit 10 may reflect the detection result obtained by the humidity sensor on the intensity of the output of control of each actuator for recreating an immersive space. For example, when the target point is a part of a hot region, the control unit 10 controls the air conditioning device 21 to raise a temperature inside the car. In addition, when it can be determined based on the detection result obtained by the humidity sensor that the user does not feel hot (not sweating), the temperature may be set to a still higher temperature.

As described above, the immersive car according to the present embodiment is capable of receiving not only manipulation inputs from the manipulation input unit 15 and the driving input device, but also receiving an audio input, a gesture input, a pressure input, and the like. A user who takes a seat other than the driver seat can also input a command through a sound, a gesture, or the like.

[4-3. Influence on Actuator in External Environment]

The immersive feeling providing system according to the present embodiment may be configured to have an influence from the immersive car 1 onto an actuator group disposed in each remote location. The detailed description will be made below with reference to FIGS. 9 to 10.

Figure 9:
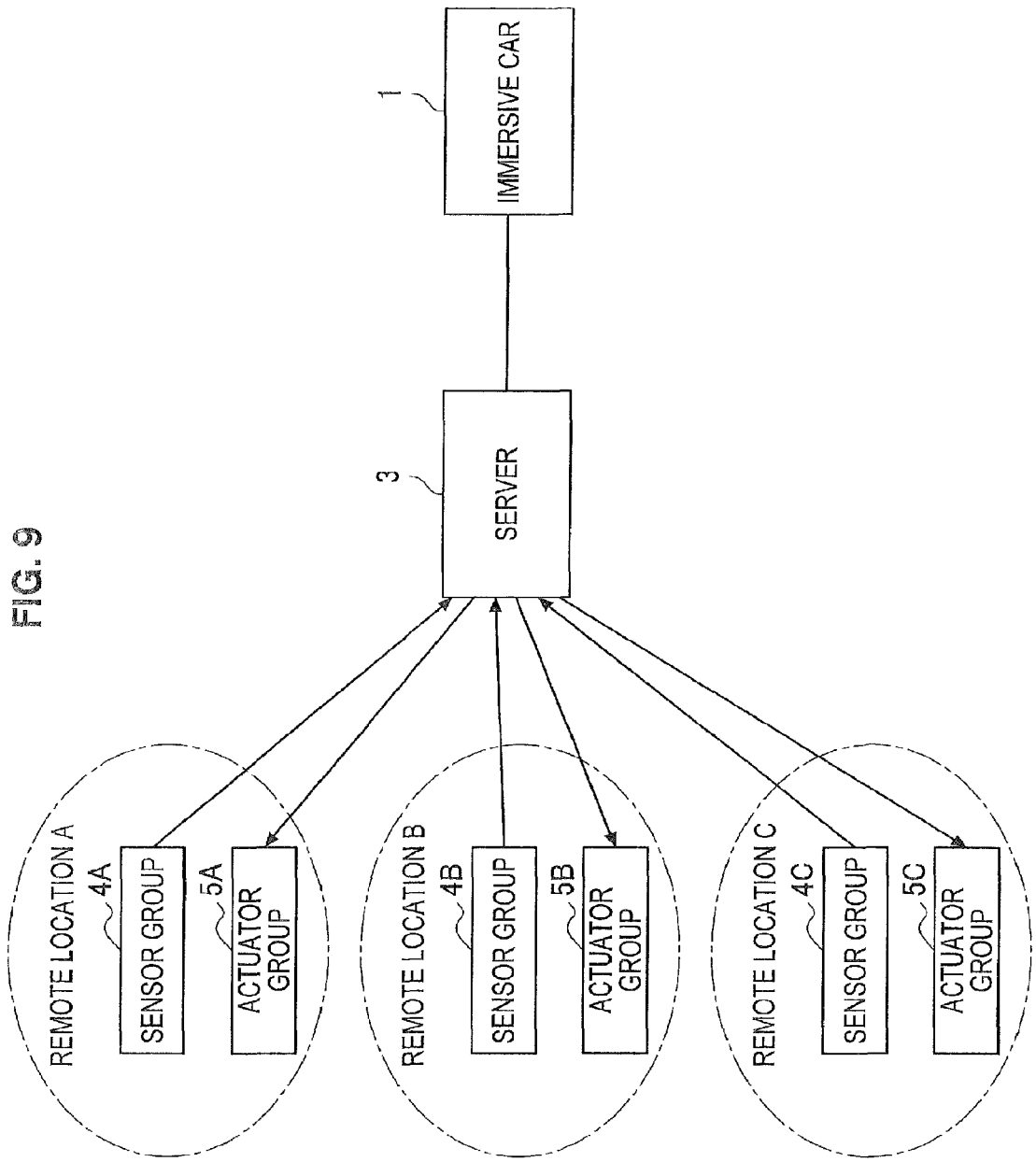
FIG. 9 is a diagram for describing an overview of an immersive feeling providing system according to a modified example of the present embodiment.

FIG. 9 is a diagram for describing an overview of an immersive feeling providing system according to a modified example of the present embodiment. As illustrated in FIG. 9, sensor groups 4A to 4C and actuator groups 5A to 5C are disposed in remote locations A to C, respectively.

The actuator groups 5A to 5C operate via a server 3 based on an instruction from an immersive car 1. The actuator groups 5A to 5C is, for example, speakers or display devices. For example, when the immersive car 1 is virtually driven in a remote location, the speakers disposed in the remote location may output driving sounds and the display devices may display driving images of the immersive car 1. The server 3 may generate the driving sounds and the driving images, or a user who rides on the immersive car 1 may designate the driving sounds and the driving images.

The actuator groups may be not only speakers or display devices disposed on the spot, but may also be actuator groups currently positioned in the remote location. Specifically, as illustrated in FIG. 10, for example, the actuator groups may be a speaker 51 or a display unit 53 provided in an information processing terminal 50 such as a smartphone held by another user who is currently in the remote location A.

Figure 10:
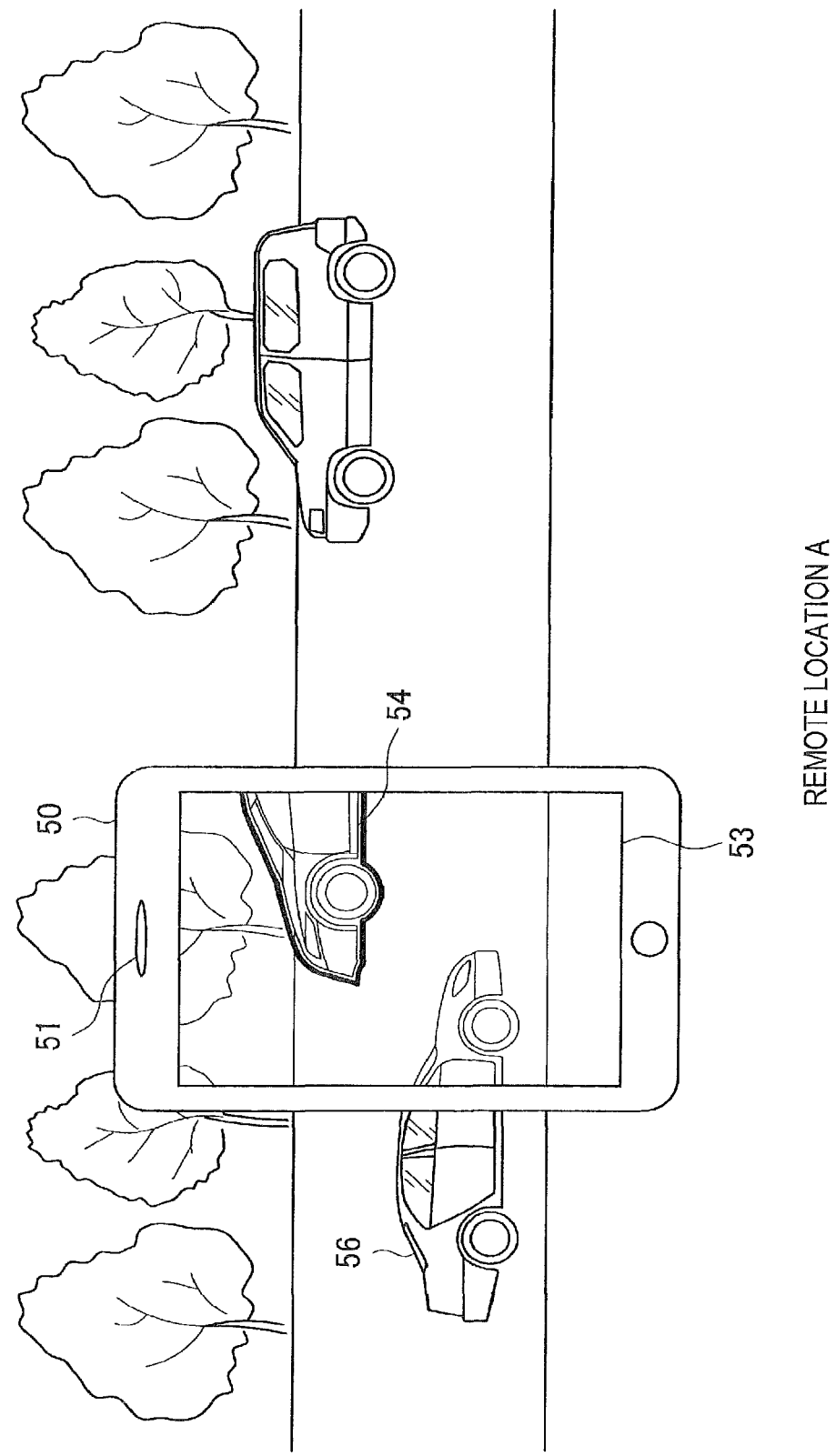
FIG. 10 is a diagram for describing an influence on an actuator group in a remote location A.

FIG. 10 is a diagram for describing an influence on an actuator group in a remote location A. As illustrated in FIG. 10, when the information processing terminal 50 capable of performing data communication with the server 3 is held over a road in the remote location A, the display unit 53 displays an image of the road ahead obtained by capturing the road ahead by a camera (not illustrated) provided on the back of the information processing terminal 50. Thus, the display unit 53 displays an automobile 56, which is actually driven on the road at the moment. Furthermore, the information processing terminal 50 can receive information regarding the immersive car 1, which is virtually driven in the remote location A, from the server 3 and can superimpose an AR image 54 of the immersive car 1 on the image of the road in the real space. The information processing terminal 50 may also receive a driving sound of the immersive car 1 from the server 3 to reproduce the driving sound from the speaker 51. The user in the remote location A can hereby enjoy watching the automobile that is currently driven in the immersive space.

Although the influence on the actuator group in the remote location (target point) in which the immersive car 1 is virtually driven at the moment has been described, the system according to the present embodiment is not limited thereto. An actuator group in another location may be influenced. For example, in the present embodiment, when an immersive space for the same race circuit is recreated within a plurality of immersive cars and the immersive cars are virtually racing with each other in the race circuit, it is possible to recreate the race in another place based on this information. Specifically, in the present embodiment, a moving image showing a plurality of immersive cars are racing with each other in a race circuit may be generated and reproduced based on pieces of manipulation information and the like from driving input devices of the plurality of immersive cars. Another user can hereby watch the race in the immersive space.

Additionally, as another example of the influence on the actuator group disposed in the remote location, for example, a user in the immersive car 1' can have a conversation with people who are currently in a sightseeing area through a display device and a speaker disposed in the sightseeing area.

[4-4. Other Examples of Configuration of System]

As illustrated in FIG. 1, the immersive feeling providing system according to the above-described present embodiment includes the single server 3, and this is only an example. Needless to say, the immersive feeling providing system according to the embodiment of the present disclosure may include a plurality of the servers. The detailed description will be made below with reference to FIGS. 11 to 12.

Figure 11:
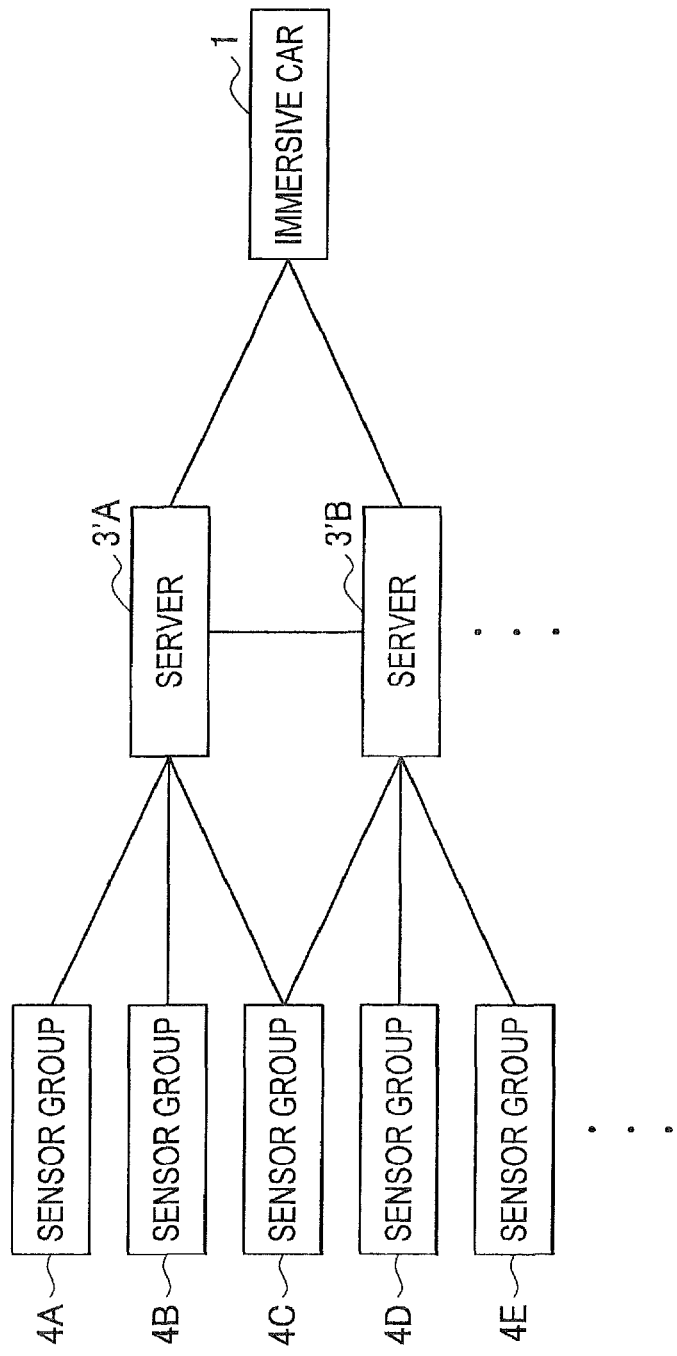
FIG. 11 is a diagram illustrating an example of a configuration of an immersive feeling providing system according to a modified example of the present embodiment.

FIG. 11 is a diagram illustrating an example of a configuration of an immersive feeling providing system according to a modified example of the present embodiment. As illustrated in FIG. 11, the immersive feeling providing system according to the present modified example includes a plurality of servers 3'A and 3'B, an immersive car 1, and sensor groups 4A, 4B, 4C, 4D, and 4E each disposed in a remote location.

The server 3'A and 3'B connect to the immersive car 1 and connect to the sensor groups. Here, in the example illustrated in FIG. 11, the server 3'A connects to the sensor groups 4A to 4C, and the server 3'B connects to the sensor groups 4C to 4E. In this way, the plurality of servers 3'A and 3'B may connect to different sensor groups or may connect to the same sensor groups. Configurations of the servers 3' will be described below.

The immersive car 1 acquires environmental information from at least one of the server 3'A and the server 3'B. The immersive car 1 may transmit a recreation request command to one of the servers 3', which has been set in advance, or may transmit the recreation request commands to all of the servers 3'.

Here, for example, the server 3'A does not connect to the sensor groups 4D and 4E. Consequently, it is assumed that when environmental information regarding a target point is acquired from the sensor group 4D, the environmental information regarding the target point may not be acquired even if a recreation request command is transmitted to the server 3'A. It is also assumed that the immersive car 1 may not determine in advance to which of the servers 3' a recreation request command has to be transmitted in order to acquire the environmental information regarding the target point.

It is hereby desirable in the present embodiment that, for example, the servers 3' are configured to be capable of performing data communication with another server. Configurations of the servers 3' will be described below with reference to FIG. 12.

(Configurations of Servers 3')

Figure 12:
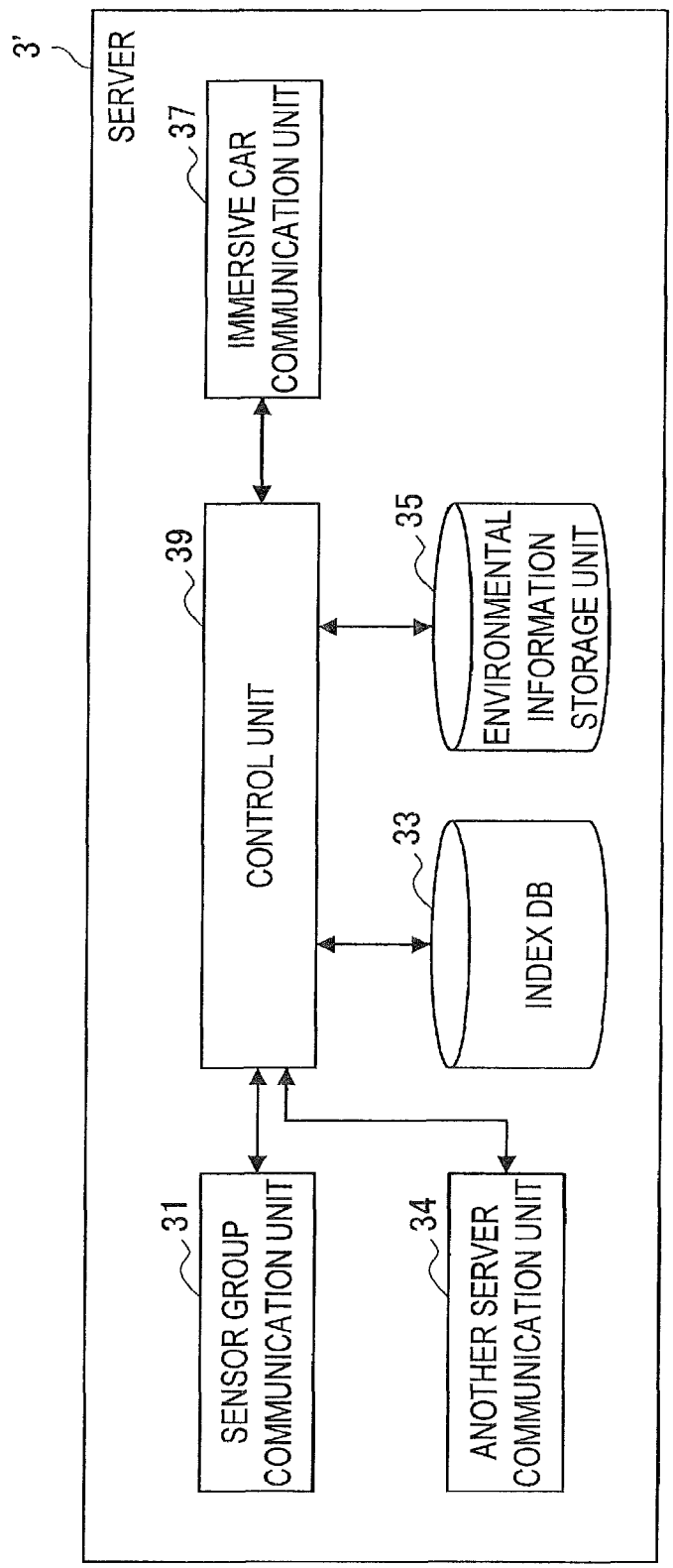
FIG. 12 is a block diagram illustrating a configuration of a server according to a modified example of the present embodiment.

FIG. 12 is a block diagram illustrating the configurations of servers 3' according to a modified example of the present embodiment. As illustrated in FIG. 12, the servers 3' each include a sensor group communication unit 31, a control unit 39, an index DB 33, an environmental information storage unit 35, an immersive car communication unit 37, and another server communication unit 34. Since the sensor group communication unit 31, the index DB 33, the environmental information storage unit 35, and the immersive car communication unit 37 have been described with reference to FIG. 4, the description for them is omitted here.

The another server communication unit 34 performs data communication with the other servers 3'. For example, the another server communication unit 34 receives index information regarding environmental information stored in a storage unit of the other server 3'B from the other server 3'B.

The control unit 39 controls the configuration of each of the servers 3'. Specifically, for example, the control unit 39 controls the index information received by the another server communication unit 34 from the other server 3'B to be registered in the index DB 33.

Once the immersive car communication unit 37 receives a recreation request command from the immersive car 1, the control unit 39 confirms, by referring to the index DB 33, which server retains environmental information regarding a designated specific place (target point).

Upon confirming that a piece or all the pieces of environmental information used for handling the recreation request command are retained in the other server 3'B, the control unit 39 accesses the other server 3'B via the another server communication unit 34 and acquires the environmental information used for handling the recreation request command.

Alternatively, upon confirming that the piece or all the pieces of environmental information used for handling the recreation request command are retained in the other server 3'B, the control unit 39 may issue an instruction to the immersive car 1 such that the recreation request command is transmitted to the other server 3'B. In this case, the immersive car 1 can transmit the recreation request command to the other server 3'B in response to the instruction and can acquire the environmental information used for handling the recreation request command.

5. Conclusion

As described above, it is possible to recreate spatial presence of a specific place in an immersive car, based on environmental information acquired from a sensor group disposed in the specific place, and to provide an immersive feeling in the immersive feeling providing system according to the present embodiment. The immersive car may also be used as an immersive space used for providing an immersive feeling and may be for a usual driving use.

Furthermore, the immersive car according to the present embodiment can set one of the driving mode, which is for a usual driving use, and the immersive mode (immersion mode), which is used for recreating spatial presence and having a user enjoy an immersive feeling.

It should be understood by those skilled in the art that various modifications, combinations, sub-combinations and alterations may occur depending on design requirements and other factors insofar as they are within the scope of the appended claims or the equivalents thereof.

For example, in the above-described embodiments, even a user in a rear seat can enjoy an immersive space by watching an image of a target point displayed on the ceiling, the floor, and the side glass. In this case, while the immersive car 1 is actually driven, the immersive space can be recreated for the user in the rear seat as long as the recreation does not interrupt the driver.

In the above-described case, the immersive car 1 may control the recreation of the immersive space mainly for the user in the rear seat in accordance with an actual traffic congestion situation. For example, the control unit 10 may control the recreation of the immersive space mainly for the user in the rear seat such that the user arrives at a destination in an actual arrival time that a navigation device 27 calculates taking the actual traffic congestion situation into consideration. Specifically, the control unit 10 may recreate the immersive space based on environmental information acquired from a sensor group disposed on a driving route from the current position to the destination such that the user arrives at the destination in the actual arrival time and may provide such a feeling as the user virtually drove to the destination.

A passenger can hereby feel as if he or she kept driving to the destination in the immersive space even if the passenger is in the traffic congestion in the real space. The immersive car 1 controls the arrival time in the immersive space such that the arrival time in the immersive space coincides with a time at which the immersive car 1 arrives at the destination in the real space. As a result, it is possible to reduce stress generated from a gap between the arrival times in the real space and the immersive space.

The described-above immersive car may be not only an automobile, but may also be a bus, a truck, and a jeep. The immersive car may further be a mobile object such as a train, a monorail, a cable car, a ship, an airplane, a helicopter, and a rocket.

Additionally, the present technology may also be configured as below:

(1) A mobile object including:
an input detection unit configured to detect an input from an outside;
an acquisition unit configured to acquire environmental information detected by a sensor in a remote location, in accordance with a content of detection performed by the input detection unit; and
a control unit configured to control an actuator other than a driving actuator in accordance with the environmental information acquired by the acquisition unit, the driving actuator relating to movement of the mobile object.

(2) The mobile object according to (1), wherein the acquisition unit acquires the environmental information detected by the sensor, in accordance with position information detected by the input detection unit, the sensor being disposed in a vicinity of a position indicated by the position information.

(3) The mobile object according to (1) or (2), wherein the environmental information is detected by the sensor in a real time.

(4) The mobile object according to any one of (1) to (3), wherein the sensor is a sensor disposed in a remote location.

(5) The mobile object according to any one of (1) to (4),
wherein the input detection unit detects position information based on a letter input or an audio input, and
wherein the position information is a name of a region, an address, or a name of an institution.

(6) The mobile object according to any one of (1) to (5),
wherein the actuator other than the driving actuator is a display device, an air conditioning device, a speaker, or a fragrance generator provided in the mobile object,
wherein the control unit performs display control, temperature control, audio reproduction control, or fragrance generation control in accordance with the environmental information used for recreating an environment in the remote location.

(7) The mobile object according to (6), wherein the display device is provided on at least one or more of a windshield, a side glass, a rear glass, a ceiling, a side, a floor, and a back of a front seat of the mobile object.

(8) The mobile object according to any one of (1) to (7), further including:
a mode setting unit configured to set an operation mode of the mobile object to one of a movement mode and an immersion mode.

(9) The mobile object according to (8), wherein, when the movement mode is set by the mode setting unit, the control unit controls the driving actuator in accordance with an input to the driving actuator, the input being detected by the input detection unit.

(10) The mobile object according to (8), wherein, when the immersion mode is set by the mode setting unit, the control unit controls the actuator other than the driving actuator in accordance with an input to the driving actuator and the environmental information, the input being detected by the input detection unit.

(11) The mobile object according to (10), wherein the input detection unit detects a user manipulation to a handle, an accelerator, or a brake provided in the mobile object, as an input to the driving actuator.

(12) The mobile object according to any one of (1) to (10), further including:
a transmission unit configured to transmit an operation instruction to an actuator in accordance with a user manipulation, the actuator being disposed in a vicinity of the sensor that detects the environmental information.

(13) A system including:
a mobile object including
an input detection unit configured to detect an input from an outside,
an acquisition unit configured to acquire, from a server, environmental information detected by a sensor in a remote location, in accordance with a content of detection performed by the input detection unit, and
a control unit configured to control an actuator other than a driving actuator in accordance with the environmental information acquired by the acquisition unit, the driving actuator relating to movement of the mobile object; and
the server including
a first reception unit configured to receive, from a sensor disposed in a remote location, environmental information detected by the sensor,
a second reception unit configured to receive the content of the detection performed by the input detection unit from the mobile object, and
a transmission unit configured to transmit, to the mobile object, the environmental information received by the first reception unit, in accordance with the content of the detection received by the second reception unit.

(14) A storage medium having a program stored thereon, the program causing a computer to function as:
an input detection unit configured to detect an input from an outside;
an acquisition unit configured to acquire environmental information detected by a sensor in a remote location, in accordance with a content of detection performed by the input detection unit; and
a control unit configured to control an actuator other than a driving actuator in accordance with the environmental information acquired by the acquisition unit, the driving actuator relating to movement of the mobile object.

The invention claimed is:

1. A server, comprising:
circuitry configured to:
communicate with a remotely located user device and an information processing apparatus;
generate virtual object display information corresponding to instruction information received from the remotely located user device, wherein the instruction information is a user input to environmental information detected by a sensor at a location in the real world; and
transmit the virtual object display information to the information processing apparatus for superimposing a virtual object corresponding to the virtual object display information on a scene of the location in the real world.

2. The server according to claim 1, wherein the circuitry is further configured to receive an image detected by the sensor at the location in the real world.

3. The server according to claim 1, wherein the circuitry is further configured to receive a sound detected by the sensor at the location in the real world.

4. The server according to claim 1, wherein the virtual object is a vehicle.

5. The server according to claim 1, wherein the virtual object is determined based on the user input.

6. The server according to claim 1, wherein the circuitry is further configured to:
receive a sound detected by the sensor at the location in the real world; and
transmit the received sound to the information processing apparatus for reproduction of the sound.

7. The server according to claim 6, wherein the received sound is a driving sound of a vehicle.

8. A method, comprising:
in a server:
communicating with a remotely located user device and an information processing apparatus;
generating virtual object display information corresponding to instruction information received from the remotely located user device, wherein the instruction information is a user input to environmental information detected by a sensor at a location in the real world; and
transmitting the virtual object display information to the information processing apparatus for superimposing a virtual object corresponding to the virtual object information on a scene of the location in the real world.

9. The method according to claim 8, further comprising receiving an image detected by the sensor at the location in the real world.

10. The method according to claim 8, further comprising receiving a sound detected by the sensor at the location in the real world.

11. The method according to claim 8, wherein the virtual object is a vehicle.

12. The method according to claim 8, wherein the virtual object is determined based on the user input.

13. The method according to claim 8, further comprising:
receiving a sound detected by the sensor at the location in the real world; and
transmitting the received sound to the information processing apparatus for reproduction of the sound.

14. The method according to claim 13, wherein the received sound is a driving sound of a vehicle.

15. A non-transitory computer-readable medium having stored thereon a set of computer-executable instructions which when executed by a computer causes the computer to perform steps comprising:
communicating with a remotely located user device and an information processing apparatus;
generating virtual object display information corresponding to instruction information received from the remotely located user device, wherein the instruction information is a user input to environmental information detected by a sensor at a location in the real world; and
transmitting the virtual object display information to the information processing apparatus for superimposing a virtual object corresponding to the virtual object information on a scene of the location in the real world.

16. The non-transitory computer-readable medium according to claim 15, the steps further comprising receiving an image detected by the sensor at the location in the real world.

17. The non-transitory computer-readable medium according to claim 15, the steps further comprising receiving a sound detected by the sensor at the location in the real world.

18. The non-transitory computer-readable medium according to claim 15, wherein the virtual object is a vehicle.

19. The non-transitory computer-readable medium according to claim 15, wherein the virtual object is determined based on the user input.

20. The non-transitory computer-readable medium according to claim 15, the steps further comprising:
   receiving a sound detected by the sensor at the location in the real world; and
   transmitting the received sound to the information processing apparatus for reproduction of the sound.

* * * * *